United States Patent
Yoshida et al.

(10) Patent No.: US 11,020,810 B2
(45) Date of Patent: Jun. 1, 2021

(54) METHOD FOR PRODUCING TURBINE BLADE

(71) Applicant: Mitsubishi Hitachi Power Systems, Ltd., Kanagawa (JP)

(72) Inventors: Daisuke Yoshida, Kanagawa (JP); Masaki Taneike, Tokyo (JP); Yoshiyuki Inoue, Kanagawa (JP); Hisataka Kawai, Osaka (JP); Hisashi Kitagaki, Osaka (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 219 days.

(21) Appl. No.: 16/320,643

(22) PCT Filed: Oct. 5, 2017

(86) PCT No.: PCT/JP2017/036266
§ 371 (c)(1),
(2) Date: Jan. 25, 2019

(87) PCT Pub. No.: WO2018/066643
PCT Pub. Date: Apr. 12, 2018

(65) Prior Publication Data
US 2019/0160571 A1 May 30, 2019

(30) Foreign Application Priority Data
Oct. 7, 2016 (JP) .............................. JP2016-198775

(51) Int. Cl.
*B23K 1/00* (2006.01)
*F01D 5/28* (2006.01)
(Continued)

(52) U.S. Cl.
CPC .............. *B23K 1/0018* (2013.01); *B23K 1/00* (2013.01); *C22C 19/056* (2013.01); *C22F 1/002* (2013.01);
(Continued)

(58) Field of Classification Search
CPC .... B23K 1/0018; B23K 1/00; B23K 2103/08; B23K 2101/001; B23K 3/06; F02C 7/00;
(Continued)

(56) References Cited

U.S. PATENT DOCUMENTS 4,373,656 A * 2/1983 Parker, Jr. ............. C23F 11/149
148/254
5,478,417 A * 12/1995 Heck ....................... C22C 38/10
148/328
(Continued)

FOREIGN PATENT DOCUMENTS

EP 2 966 190 1/2016
JP 2002-103031 4/2002
(Continued)

OTHER PUBLICATIONS

International Search Report dated Nov. 14, 2017 in International (PCT) Application No. PCT/JP2017/036266 with English translation.
(Continued)

*Primary Examiner* — Kiley S Stoner
(74) *Attorney, Agent, or Firm* — Wenderoth, Lind & Ponack, L.L.P.

(57) ABSTRACT

A method of manufacturing a turbine blade includes a brazing treatment for joining a brazing material to a base material of a turbine blade by heating the base material having the brazing material arranged thereon and melting the brazing material, a stabilizing treatment for heating the base material having been subjected to the brazing treat-
(Continued)

ment; and an aging treatment for heating the base material having been subjected to the stabilizing treatment. The brazing treatment and the stabilizing treatment are performed with a sequential heating treatment.

9 Claims, 11 Drawing Sheets

(51) Int. Cl.
| | |
|---|---|
| C22C 19/05 | (2006.01) |
| C22F 1/10 | (2006.01) |
| F02C 7/00 | (2006.01) |
| F01D 25/00 | (2006.01) |
| F01D 9/02 | (2006.01) |
| C22F 1/00 | (2006.01) |
| B23K 103/08 | (2006.01) |
| B23K 101/00 | (2006.01) |

(52) U.S. Cl.
CPC .............. *C22F 1/10* (2013.01); *F01D 5/28* (2013.01); *F01D 5/286* (2013.01); *F01D 5/288* (2013.01); *F01D 9/02* (2013.01); *F01D 25/00* (2013.01); *F02C 7/00* (2013.01); *B23K 2101/001* (2018.08); *B23K 2103/08* (2018.08); *F05D 2230/237* (2013.01); *F05D 2230/40* (2013.01); *F05D 2230/90* (2013.01); *F05D 2300/17* (2013.01); *F05D 2300/611* (2013.01)

(58) Field of Classification Search
CPC ... F01D 25/00; F01D 9/02; F01D 5/28; F01D 5/286; F01D 5/288; C22F 1/002; C22F 1/10; F05D 2230/40; F05D 2230/237; F05D 2230/90; F05D 2300/611; F05D 2300/17; C22C 19/05; C22C 19/056
USPC .......... 228/245–255, 119; 29/889.1–889.722
See application file for complete search history.

(56) References Cited

U.S. PATENT DOCUMENTS

| | | | | |
|---|---|---|---|---|
| 6,159,314 A * | 12/2000 | Koizumi | ................... | C22F 1/10 148/428 |
| 2001/0039984 A1 * | 11/2001 | Nonomura | ............ | C22C 19/056 148/677 |
| 2002/0053376 A1 * | 5/2002 | Nonomura | ................ | C22F 1/10 148/677 |
| 2005/0076501 A1 | 4/2005 | Jeutter et al. | | |
| 2005/0167010 A1 * | 8/2005 | Arai | .......................... | B26B 3/00 148/428 |
| 2007/0169860 A1 * | 7/2007 | Groh | ....................... | C21D 9/00 148/675 |
| 2008/0257457 A1 * | 10/2008 | Cao | ......................... | C22C 19/05 148/428 |
| 2009/0148337 A1 * | 6/2009 | Kim | ..................... | C21D 9/0068 420/441 |
| 2009/0188590 A1 * | 7/2009 | Hu | ......................... | B23P 6/007 148/528 |
| 2009/0274927 A1 * | 11/2009 | Narita | .................... | B32B 15/01 428/652 |
| 2009/0297701 A1 * | 12/2009 | Jabado | ................... | C30B 33/00 427/142 |
| 2009/0317288 A1 * | 12/2009 | Yokokawa | ................ | C22F 1/02 420/448 |
| 2010/0226779 A1 * | 9/2010 | Koizumi | ................. | C22C 19/05 416/223 R |
| 2013/0133793 A1 * | 5/2013 | McDevitt | ................. | C22F 1/10 148/707 |
| 2013/0186106 A1 * | 7/2013 | Oikawa | .................... | C21D 7/13 60/805 |
| 2013/0188774 A1 * | 7/2013 | Ogura | ..................... | H01J 35/08 378/62 |
| 2013/0316183 A1 * | 11/2013 | Kulkarni, Jr. | ........... | B23P 6/007 428/557 |
| 2014/0369741 A1 * | 12/2014 | Cui | .................... | B23K 20/1205 403/271 |
| 2014/0373979 A1 * | 12/2014 | Gu | .......................... | C22C 30/00 148/428 |
| 2015/0013852 A1 | 1/2015 | Etter et al. | | |
| 2015/0377043 A1 * | 12/2015 | Haraguchi | .............. | F01D 5/286 415/208.1 |
| 2016/0024637 A1 * | 1/2016 | Nakano | .................... | C25D 5/50 428/610 |
| 2016/0146024 A1 * | 5/2016 | Morris | ................... | B23K 31/02 416/96 R |
| 2016/0167172 A1 * | 6/2016 | Goncharov | .......... | B23K 1/0056 219/76.12 |
| 2016/0175998 A1 * | 6/2016 | Ozbaysal | ................. | C22F 1/10 148/528 |
| 2017/0022827 A1 * | 1/2017 | Waldman | .............. | F01D 5/3061 |
| 2017/0100804 A1 * | 4/2017 | Goncharov | ............. | B23P 15/02 |
| 2018/0104765 A1 * | 4/2018 | Bochiechio | ............... | F01D 5/34 |
| 2018/0179622 A1 * | 6/2018 | Taneike | ..................... | C22C 1/02 |
| 2018/0257181 A1 * | 9/2018 | Goncharov | .......... | B23K 10/027 |
| 2018/0326533 A1 * | 11/2018 | Raghavan | ............. | B23K 11/04 |
| 2019/0168327 A1 * | 6/2019 | Yoshida | .................. | C23C 4/02 |
| 2019/0234220 A1 * | 8/2019 | Yoshida | .................. | C23C 28/00 |

FOREIGN PATENT DOCUMENTS

| | | |
|---|---|---|
| JP | 2005-527373 | 9/2005 |
| JP | 2006-299378 | 11/2006 |
| JP | 2006-299410 | 11/2006 |
| JP | 2013-133505 | 7/2013 |
| JP | 2013-194694 | 9/2013 |
| JP | 2014-037579 | 2/2014 |
| JP | 2015-517028 | 6/2015 |
| WO | 03/053622 | 7/2003 |
| WO | 2014/136235 | 9/2014 |

OTHER PUBLICATIONS

Written Opinion of the International Searching Authority dated Nov. 14, 2017 in International PCT) Application No. PCT/JP2017/036266 with English translation.
Office Action dated Mar. 31, 2020 in corresponding German Patent Application No. 112017005115.0, with English Translation.
Notice of Reasons for Refusal dated Apr. 28, 2020 in corresponding Japanese Patent Application No. 2016-198775, with English Translation.

\* cited by examiner

METHOD FOR PRODUCING TURBINE BLADE

TECHNICAL FIELD

The present invention relates to a method of manufacturing a turbine blade.

BACKGROUND ART

A gas turbine includes a compressor, a combustor, and a turbine. The compressor takes in and compresses an air to produce a high-temperature and high-pressure compressed air. The combustor burns the compressed air by supplying fuel to the compressed air. As the turbine in a vehicle cabin, a plurality of stator blades and rotor blades are alternately arranged. In the turbine, the rotor blades are rotated by a high-temperature and high-pressure combustion gas generated from the compressed air. With the rotation, a thermal energy is converted into a rotational energy.

The turbine blades such as the stator blades and the rotor blades are exposed in a high temperature environment, and thus are formed of metallic materials having a high heat-resisting property. When the turbine blades are manufactured, a base material is formed through casting, forging, and the like, and is subjected to heating and solutionizing treatment as described in, for example, JP 2002-103031 A. After that, a brazing material is arranged on the base material, and is heated. Accordingly, the base material is subjected to brazing treatment. After the base material is cooled, the base material is subjected to heat treatment for stabilizing treatment and aging treatment.

In the manufacturing method described in JP 2002-103031 A, in the stabilizing treatment, the heat treatment is performed at a temperature higher than a liquidus temperature of the brazing material used for the brazing treatment. Therefore, when the base material having been subjected to the brazing treatment is subjected to the stabilizing treatment, there may be a case where the brazing material is melted again by heating to cause a break of the brazing material. Thus, in the related art, the stabilizing treatment requires work of adding the brazing material to the base material, which is laborious.

The present invention has been made in view of the above-mentioned problem, and has an object to provide a method of manufacturing a turbine blade capable of alleviating burden in manufacturing steps.

Solution to Problem

A method of manufacturing a turbine blade according to an embodiment of the present invention includes brazing treatment for joining a brazing material to a base material of a turbine blade by heating the base material having the brazing material arranged thereon and melting the brazing material, stabilizing treatment for heating the base material having been subjected to the brazing treatment; and aging treatment for heating the base material having been subjected to the stabilizing treatment. The brazing treatment and the stabilizing treatment are performed with one heating treatment.

According to an embodiment of the present invention, the brazing treatment and the stabilizing treatment are performed with one heating treatment. Accordingly, work of adding the brazing material again itself is not required. With this, burden in the manufacturing steps can be alleviated. Further, two kinds of treatment including the brazing treatment and the stabilizing treatment are performed collectively. Thus, efficient treatment can be achieved for a short time period.

Further, the brazing treatment and the stabilizing treatment may be performed at a first temperature higher than a liquidus temperature of the brazing material, at which a γ' phase precipitated in the base material is increased.

According to an embodiment of the present invention, the brazing treatment and the stabilizing treatment are performed with one heating treatment in a parallel manner. Accordingly, the heating treatment can efficiently be performed.

Further, the brazing treatment, the stabilizing treatment, and the aging treatment may sequentially be performed.

According to an embodiment of the present invention, the brazing treatment, the stabilizing treatment, and the aging treatment are sequentially performed. Thus, a time period of the heating treatment can be shortened.

Further, adjusting treatment for adjusting a heating temperature for the aging treatment to a second temperature may be performed after the brazing treatment and the stabilizing treatment are performed at the first temperature.

According to an embodiment of the present invention, during one heating treatment, heating is sequentially performed by adjusting a heating temperature from the first temperature to the second temperature. Thus, the heating treatment can efficiently be performed.

Further, the second temperature may be lower than the first temperature.

According to an embodiment of the present invention, the heating temperature is lowered from the first temperature to the second temperature. Accordingly, the heat after the brazing treatment and the stabilizing treatment are performed can efficiently be utilized.

Further, the brazing treatment, the stabilizing treatment, and the aging treatment may be performed in a predetermined heating furnace including a heater. In the adjusting treatment, a furnace internal temperature may be lowered by stopping the heater or by stopping the heater and supplying a cooling air to the heating furnace.

According to an embodiment of the present invention, when the heater is stopped to perform the adjusting treatment, a workload such as cooling work and a temperature management is reduced, and the procedure can be simplified. Further, when the adjusting treatment is performed by stopping the heater and supplying a cooling air to the heating furnace, the temperature of the heating furnace can be lowered in a short time period.

Further, in the adjusting treatment, the heater may be operated, and the furnace internal temperature may rise to the second temperature after the furnace internal temperature is lowered to a third temperature lower than the second temperature.

According to an embodiment of the present invention, the heating treatment in which the first temperature is changed to the third temperature via the second temperature can efficiently be performed.

Further, the method of manufacturing a turbine blade may further include forming an undercoat on a surface of the base material through use of a metallic material having a higher oxidation-resisting property than the base material, and forming a topcoat on a surface of the undercoat after the undercoat is formed. The topcoat may be formed after the base material is subjected to the brazing treatment and the stabilizing treatment, and the aging treatment may be performed after the topcoat is formed.

According to an embodiment of the present invention, after the undercoat is formed, the brazing treatment and the stabilizing treatment are performed with one heating treatment before the topcoat is formed. Thus, the heating treatment can efficiently be performed in a short time period, and a crack in the topcoat can be prevented.

Further, the undercoat may be performed after the brazing treatment and the stabilizing treatment are performed.

According to an embodiment of the present invention, after the brazing treatment and the stabilizing treatment are performed, the undercoat is formed. Then, the topcoat is formed. As described above, other processes such as the heating treatment are not performed from the formation of the undercoat to the formation of the topcoat. Accordingly, foreign substances and the like are prevented from adhering to the surface of the undercoat. When the foreign substances and the like adhere to the surface, an anchoring effect of the undercoat is degraded. As a countermeasure, in this modified example, the foreign substances and the like are prevented from adhering to prevent degradation of the anchoring effect. With this, degradation of adhesiveness between the undercoat and the topcoat can be prevented.

Further, the method of manufacturing a turbine blade may further include forming the undercoat on the surface of the base material through use of a metallic material having a higher oxidation-resisting property than the base material, and forming the topcoat on the surface of the undercoat after the undercoat is formed. The topcoat may be formed after the undercoat is formed and the base material is subjected to the brazing treatment, the stabilizing treatment, and the aging treatment.

According to an embodiment of the present invention, after the undercoat is formed, the brazing treatment, the stabilizing treatment, and the aging treatment are sequentially performed before the topcoat is formed. Thus, the heating treatment can efficiently be performed in a short time period, and a spot and a crack in the topcoat can be prevented.

Advantageous Effect of Invention

According to the present invention, the method of manufacturing the turbine blade capable of alleviating burden in the manufacturing steps can be provided.

DESCRIPTION OF EMBODIMENTS

Now, with reference to the drawings, description is made of a method of manufacturing a turbine blade according to embodiments of the present invention. Note that, the invention is not limited to the embodiments. Further, the constituent elements in the following embodiments include those that can be easily replaced by a person skilled in the art or those that are substantially the same.

First Embodiment

Figure 1:
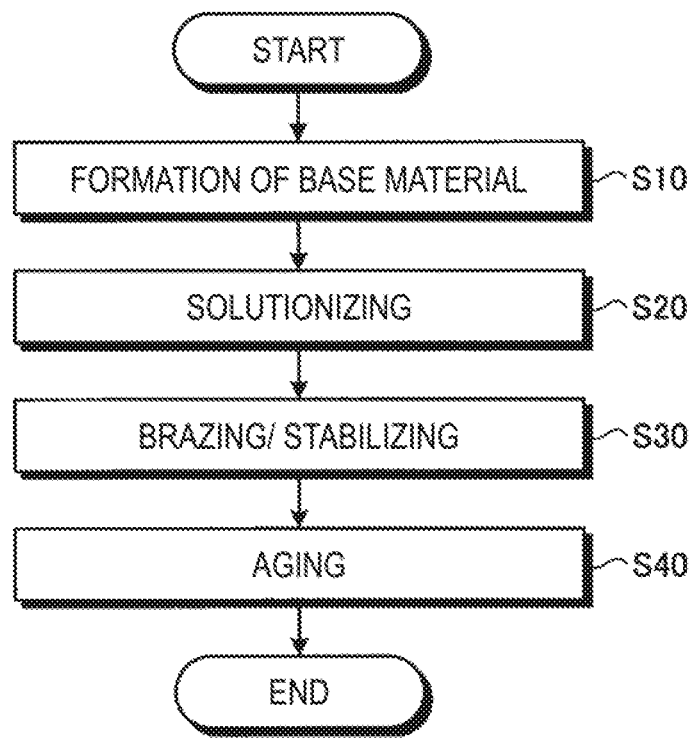
FIG. 1 is a flowchart for illustrating an example of a method of manufacturing a turbine blade according to a first embodiment of the present invention.

FIG. 1 is a flowchart for illustrating an example of a method of manufacturing a turbine blade according to a first embodiment of the present invention. As illustrated in FIG. 1, a method of manufacturing a turbine blade according to the first embodiment includes a step of forming a base material of a turbine blade such as a stator blade or a rotor blade of a gas turbine (Step S10), a step of subjecting the base material to solutionizing treatment (Step S20), a step of subjecting the base material to brazing treatment and stabilizing treatment with one heating treatment (Step S30), and a step of subjecting the base material to aging treatment (Step S40).

In Step S10, the base material forming a turbine blade such as a stator blade and a rotor blade is formed. The turbine blades are exposed in a high temperature environment in the gas turbine. Thus, the base material forming a turbine blade is formed of an alloy having a high heat-resisting property, for example, a Ni-based alloy. As the Ni-based alloy, for example, there is exemplified a Ni-based alloy containing: from 12.0% to 14.3% of Cr; from 8.5% to 11.0% of Co; from 1.0% to 3.5% of Mo; from 3.5% to 6.2% of W; from 3.0% to 5.5% of Ta; from 3.5% to 4.5% of Al; from 2.0% to 3.2% of Ti; from 0.04% to 0.12% of C; from 0.005% to 0.05% of B; and the remnant of Ni and inevitable impurities. Further, the Ni-based alloy with the above-mentioned composition may contain from 0.001 ppm to 5 ppm of Zr. Further, the Ni-based alloy with the above-mentioned composition may contain from 1 ppm to 100 ppm of Mg and/or Ca, and further may contain one or more of the following: from 0.02% to 0.5% of Pt; from 0.02% to 0.5% of Rh; and from 0.02% to 0.5% of Re. The Ni-based alloy with the above-mentioned composition may satisfy both of those conditions.

The base material is formed of the above-mentioned material through casting, forging, and the like. When the base material is formed through casting, the base material such as a conventional casting (CC) material, a directional solidification (DS) material, and a single crystal (SC) material can be formed. In the following, description is made of a case where a directional solidification material is used as the base material as an example. However, the present invention is not limited thereto, and similar description can be given even when the base material is a conventional casting material or a single crystal material.

In the solutionizing treatment in Step S20, the precipitate generated in the previous step is solutionized by heating, and segregation of components is reduced. In the solutionizing treatment, the base material is heated at a temperature of, for example, approximately 1200° C.

In the brazing treatment in Step S30, the base material having a brazing material arranged thereon is heated, and the brazing material is melted and jointed to the base material. As the brazing material, for example, a BNi-2 equivalent material is used. In this case, for example, a solidus temperature of the brazing material is approximately 970° C. An amount of the brazing material to be used for the brazing treatment is adjusted in advance by performing tests and the like. In the brazing treatment, the heating treatment is performed at a first temperature T1 at which the brazing material can be melted. The first temperature T1 can be set to, for example, from 1060° C. to 1100° C.

In the stabilizing treatment in Step S30, the base material is heated, and a γ' phase being an intermetallic compound in the base material is increased. Accordingly, a size and a form of the γ' phase and the like are uniformed. In the stabilizing treatment, for example, the heating treatment may be performed at the first temperature T1 equivalent to the heating temperature in the brazing treatment.

Figure 2:
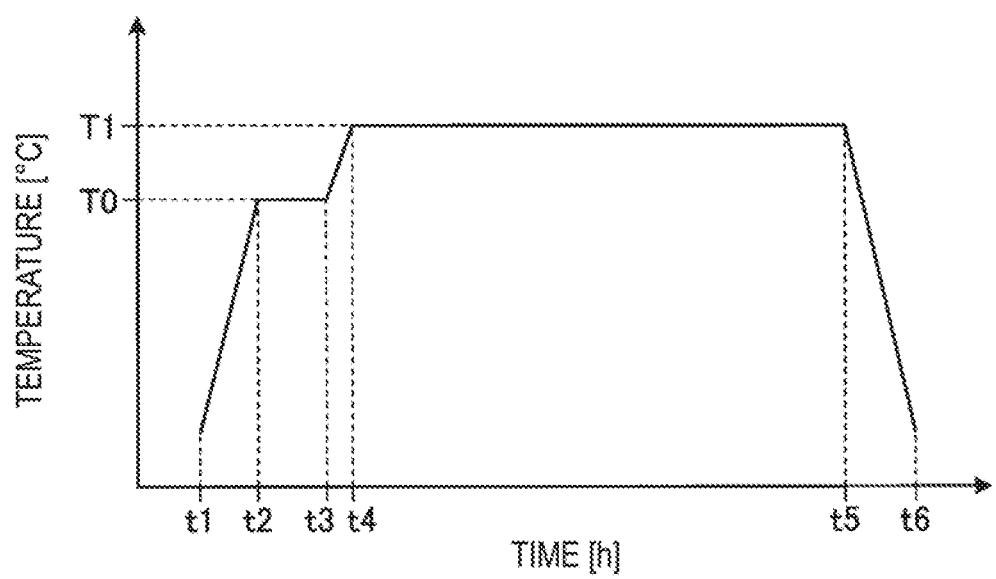
FIG. 2 is a graph for showing an example of a time change of a heating temperature in a case where brazing treatment and stabilizing treatment are performed with one heating treatment.

In the first embodiment, in Step S30, the brazing treatment and the stabilizing treatment are performed with one heating treatment. FIG. 2 is a graph for showing an example of the heating treatment in Step S30. In FIG. 2, a horizontal axis indicates time, and a vertical axis indicates a temperature.

In Step S30, the base material having the brazing material arranged thereon is placed in a predetermined heating furnace, and heating is started by operating a heater of the heating furnace (time t1). After the heating is started, first, a furnace internal temperature (heating temperature) of the heating furnace rises to a predetermined preheating temperature T0. The preheating temperature T0 is set lower than the solidus temperature of the brazing material, and may be, for example, from 930° C. to 970° C. When the furnace internal temperature reaches the preheating temperature T0 (time t2), the rise in the furnace internal temperature is stopped. Then, the heating treatment (preheating treatment) is performed at the preheating temperature T0 for a predetermined time period. With the preheating treatment, the temperatures of the base material and the brazing material rises uniformly in an entire area, and a temperature difference among the portions is reduced.

After the preheating treatment is performed for a predetermined time period (time t3), the furnace internal temperature rises again. When the furnace internal temperature reaches the first temperature T1 (time t4), a rise in the furnace internal temperature is stopped. Then, the heating treatment is performed at the first temperature T1 for a predetermined time period. With the heating treatment at the first temperature T1, the brazing material is melted and jointed to the base material. Further, in the base material, the γ' phase can be increased, and the size and the form of the γ' phase and the like can be uniformed. After the preheating treatment is performed, the heating is performed at the first temperature T1, each portion of the base material is evenly heated. Thus, brazing can be performed uniformly, and the γ' phase is increased uniformly in each portion of the base material. After the heating treatment is performed at the first temperature T1 for a predetermined time period (time t5), the temperature of the base material is lowered rapidly to a predetermined cooling temperature at a temperature lowering rate of, for example, approximately 30° C./min (quenching) by, for example, stopping the heater and supplying a cooling air into the heating furnace. With the quenching treatment, the state of the γ' phase (particle diameter and the like) is maintained. After that, when the furnace internal temperature is lowered to a predetermined cooling temperature (time t6), the treatment in Step S30 is completed. As described above, in the first embodiment, the brazing treatment and the stabilizing treatment are performed with one heating treatment.

In the aging treatment in Step S40, the base material having been subjected to the stabilizing treatment is heated. Accordingly, in the base material, the γ' phase increased in the stabilizing treatment is further increased, and the γ' phase having a smaller diameter than that of the γ' phase formed in the stabilizing treatment is precipitated. The γ' phase having a smaller diameter increases strength of the base material. Thus, in the aging treatment, the γ' phase having a smaller diameter is precipitated to increase the strength of the base material. As a result, the strength and ductility of the base material are adjusted. That is, the brazing treatment, all of the stabilizing treatment, and the aging treatment are performed so that the precipitation of the γ' phase can be adjusted and the strength and the ductility can be achieved at the same time.

In the aging treatment, for example, the heating treatment is performed at a second temperature T2 lower than the first temperature T1 for a predetermined time period. The second temperature T2 can be set to, for example, from 830° C. to 870° C. After the aging treatment is performed for a predetermined time period, the temperature of the base material is lowered rapidly to a predetermined cooling temperature at a temperature lowering rate of, for example, approximately 30° C./min (quenching) by, for example, stopping the heater of the heating furnace and supplying a cooling air into the heating furnace.

As described above, in the first embodiment, with the one heating treatment, the brazing treatment and the solutionizing treatment are performed, and hence work of adding the brazing material again itself is not required. With this, burden in the manufacturing steps can be alleviated. Further, two kinds of treatment including the brazing treatment and the stabilizing treatment are performed collectively. Thus, efficient treatment can be achieved for a short time period.

Second Embodiment

Figure 3:
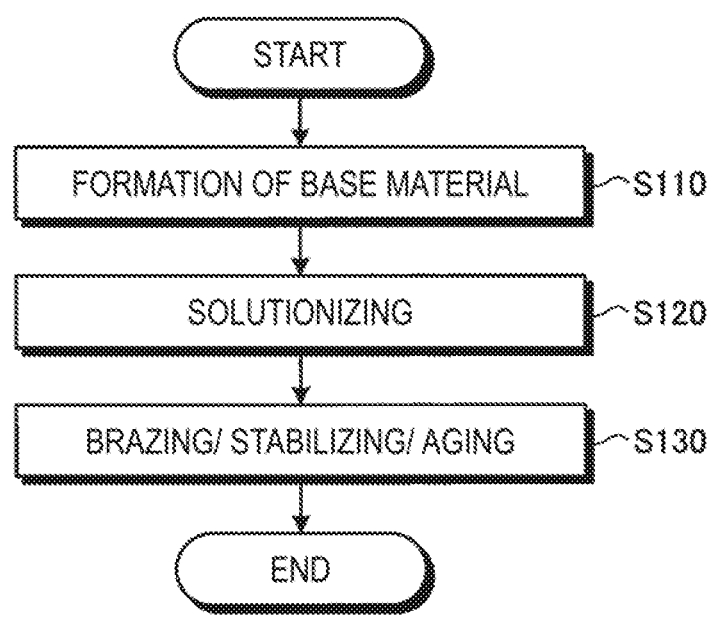
FIG. 3 is a flowchart for illustrating an example of a method of manufacturing a turbine blade according to a second embodiment of the present invention.

FIG. 3 is a flowchart for illustrating an example of a method of manufacturing a turbine blade according to a second embodiment of the present invention. As illustrated in FIG. 3, the method of manufacturing a turbine blade according to the second embodiment includes for example, a step of forming the base material of a turbine blade (Step S110), a step of subjecting the base material to the solutionizing treatment (Step S120), and a step of subjecting the base material to the brazing treatment, the stabilizing treatment, and the aging treatment (Step S130). Step S110 and Step S120 are similar to Step S10 and Step S20 in the first embodiment, respectively, and hence description thereof is omitted.

Figure 4:
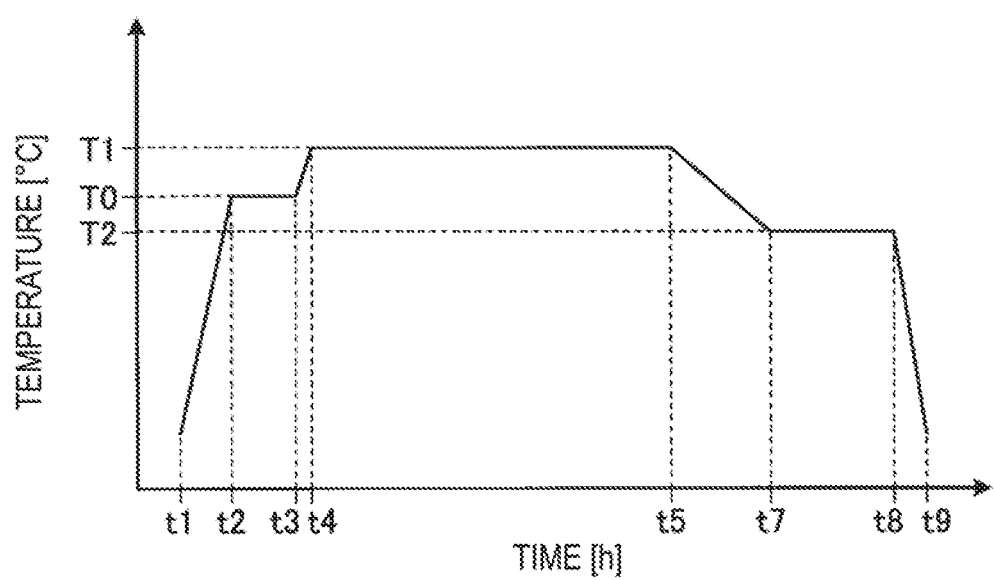
FIG. 4 is a graph for showing an example of a time change of a heating temperature in a case where brazing treatment, stabilizing treatment, and aging treatment are sequentially performed.

In the second embodiment, in Step S130, the brazing treatment, the stabilizing treatment, and the aging treatment are sequentially performed. FIG. 4 is a graph for showing an example of the heating treatment in Step S130. In FIG. 4, a horizontal axis indicates time, and a vertical axis indicates a temperature.

Similarly to the first embodiment, in Step S130, the preheating treatment is performed at the preheating temperature T0 (from time t11 to time t4), and after the preheating treatment, the heating treatment as the brazing treatment and the stabilizing treatment is performed at the first temperature T1 (from time t4 to time t5).

After the heating treatment is performed at the first temperature T1 for a predetermined time period (time t5), adjusting treatment in which the furnace internal temperature is lowered to the second temperature T2 is performed by, for example, stopping the operation of the heater. At this time, the temperature of the base material is lowered at a temperature lowering rate of, for example, from 3° C./min to 20° C./min. Therefore, as compared to the first embodiment, after the stabilizing treatment (time t5 and later), the temperature is lowered slowly.

When the furnace internal temperature reaches the second temperature T2 (time t7), the heating treatment as the aging treatment is performed under a state in which the heater is operated to set the furnace internal temperature to the second temperature T2. Thus, after the stabilizing treatment, the furnace internal temperature is shifted to the second temperature T2 for performing the aging treatment, and the aging treatment is sequentially performed without cooling the heating furnace to a predetermined cooling temperature. As described above, in the second embodiment, the brazing treatment, the stabilizing treatment, and the aging treatment are sequentially performed.

Similarly to the first embodiment, in the aging treatment, for example, the heating treatment is performed at the second temperature T2 lower than the first temperature T1 for a predetermined time period. The second temperature T2 can be set to, for example, from 830° C. to 870° C. In the second embodiment, even when the temperature is lowered slowly after the stabilizing treatment, the γ' phase is increased, and the γ' phase having a smaller diameter is precipitated in the aging treatment, similarly to the case where the quenching is performed in the first embodiment. Thus, the base material excellent in strength and ductility is formed.

After the aging treatment is performed for a predetermined time period (time t8), the temperature of the base material is lowered rapidly to a predetermined cooling temperature at a temperature lowering rate of, for example, approximately 30° C./min (quenching) by, for example, stopping the heater of the heating furnace and supplying a cooling air into the heating furnace. After the furnace internal temperature turns to a predetermined temperature (time t9), the base material is picked up from the heating furnace. In this manner, the heating treatment is completed.

As described above, in the second embodiment, the brazing treatment, the stabilizing treatment, and the aging treatment are sequentially performed. Thus, a time period of the heating treatment can further be shortened. Further, after the brazing treatment and the stabilizing treatment are performed at the first temperature T1, the adjusting treatment for adjusting the second temperature being a heating temperature for the aging treatment is performed. With this, the heat in the heating furnace can be efficiently utilized.

Third Embodiment

Figure 5:
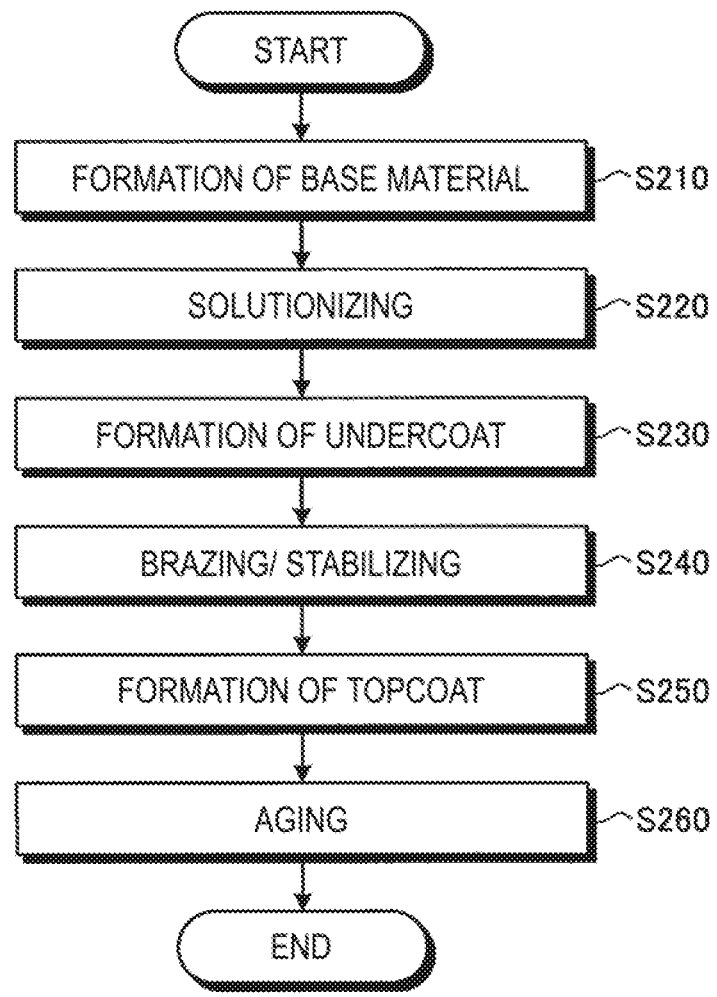
FIG. 5 is a flowchart for illustrating an example of a method of manufacturing a turbine blade according to a third embodiment of the present invention.

FIG. 5 is a flowchart for illustrating an example of a method of manufacturing a turbine blade according to a third embodiment of the present invention. As illustrated in FIG. 5, the method of manufacturing a turbine blade according to the third embodiment includes a step of forming an undercoat and a topcoat on the base material in addition to the steps in the method of manufacturing a turbine blade according to the first embodiment. The undercoat and the topcoat are formed as thermal barrier coating (TBC) for protecting a turbine blade of a gas turbine from a high temperature.

The method of manufacturing a turbine blade according to the third embodiment includes, for example, a step of forming the base material of a turbine blade (Step S210), a step of subjecting the base material to the solutionizing treatment (Step S220), a step of forming the undercoat on the base material (Step S230), a step of subjecting the base material to the brazing treatment and the stabilizing treatment with one heating treatment (Step S240), a step of forming the topcoat on the base material (Step S250), and a step of subjecting the base material to the aging treatment (Step S260).

Step S210 and Step S220 are similar to Step S10 and Step S20 in the first embodiment, respectively, and hence description thereof is omitted. After Step S220, before the undercoat is formed, a surface of the base material may be subjected to blast treatment for roughening the surface of the base material by, for example, applying alumina ($AL_2O_3$) to the surface of the base material. Further, after the blast treatment, cleaning treatment for cleaning the surface of the base material may be performed.

In Step S230, the undercoat is formed on the surface of the base material. The undercoat prevents oxidation of the base material, and improves adhesiveness of the topcoat. As a material of the undercoat, for example, an alloy material such as MCrAlY having a higher oxidation-resisting property than the base material is used. In Step S230, for example, after the surface of the base material is heated, the above-mentioned alloy material and the like are melted and applied to the surface of the base material so as to form the undercoat.

After the undercoat is formed, in Step S240, the brazing treatment and the stabilizing treatment are performed with one heating treatment. The heating treatment is performed in a similar order to Step S30 in the first embodiment. Therefore, after the base material having the undercoat formed thereon is subjected to the preheating treatment at the preheating temperature T0 (for example, from 930° C. to 970° C.), heating is performed at the first temperature T1 (for example, from 1060° C. to 1100° C.). In Step S240, the heating treatment is performed at the temperature described above. Accordingly, the undercoat spreads on the roughened surface of the base material, and the adhesiveness between the surface of the base material and the undercoat is improved.

After the brazing treatment and the stabilizing treatment, in Step S250, the topcoat is formed on a surface of the undercoat. The topcoat protects the surface of the base material from a high temperature. As a material of the topcoat, a material having a small thermal conductivity such as ceramics is used. As ceramics, a material containing, for example, zirconia as a main component is used. In Step S250, for example, the above-mentioned material is applied to the surface of the undercoat by atmospheric plasma spraying so as to form the topcoat.

After the topcoat is formed, in Step S260, the aging treatment is performed. Similarly to the first embodiment, in the aging treatment, for example, the heating treatment is performed at the second temperature T2 lower than the first temperature T1 for a predetermined time period. The second temperature T2 can be set to, for example, from 830° C. to 870° C. Note that, the aging treatment may be performed before the topcoat is formed. That is, after the brazing treatment and the stabilizing treatment, the aging treatment is sequentially performed. After that, the topcoat may be formed.

When the base material having the topcoat formed thereon is subjected to the heating treatment at a temperature exceeding 870° C., a spot, a crack, and the like may be formed in the topcoat. In the third embodiment, after the undercoat is formed, the brazing treatment and the stabilizing treatment are performed with one heating treatment before the topcoat is formed. Thus, the heating treatment can efficiently be performed in a short time period, and a crack in the topcoat can be prevented.

Figure 6:
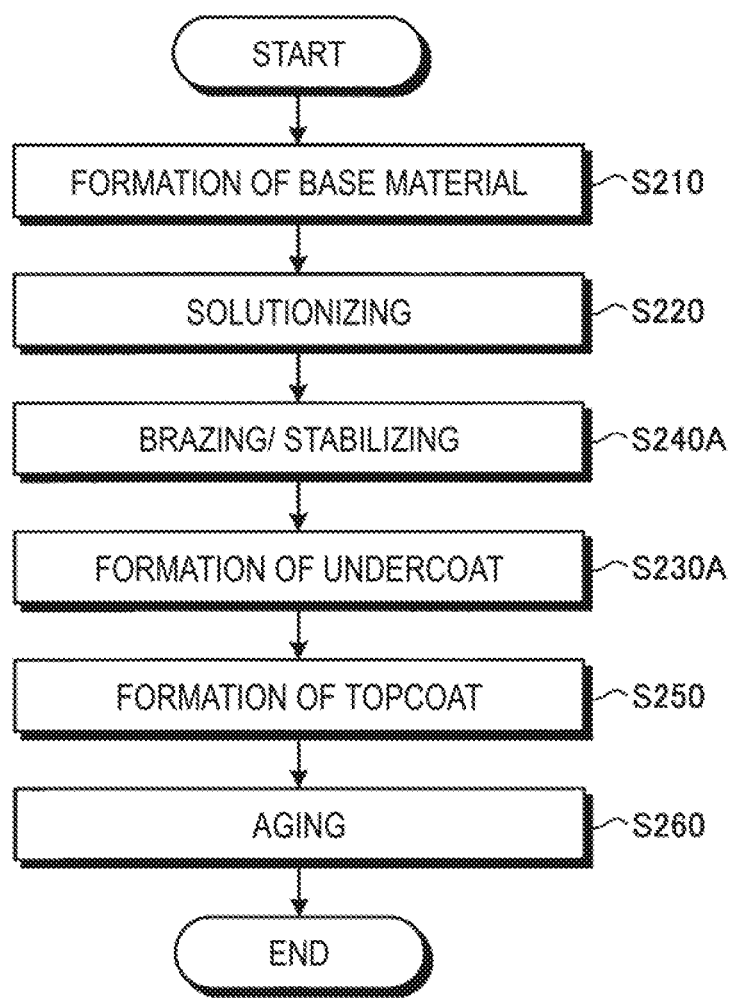
FIG. 6 is a flowchart for illustrating an example of a method of manufacturing a turbine blade according to a modified example of the present invention.

Note that, in the third embodiment, there is exemplified the case where the brazing treatment and the stabilizing treatment are performed after the undercoat is formed. However, the present invention is not limited thereto. FIG. 6 is a flowchart for illustrating an example of a method of manufacturing a turbine blade according to a modified example of the present invention. As illustrated in FIG. 6, in the method of manufacturing a turbine blade according to the modified example, Step S210 and Step S220 are similar to the third embodiment. However, the following points are different from the third embodiment. That is, after Step S220, the brazing treatment and the stabilizing treatment are performed (Step S240A), and after the brazing treatment and the stabilizing treatment, the undercoat is formed (Step S230A). After the undercoat is formed, the topcoat is formed without performing the heating treatment (Step S250). Further, similarly to the third embodiment, after the topcoat is formed, the aging treatment is performed (Step S260).

After the undercoat is formed and before the topcoat is formed, the heating treatment is not performed so that foreign substances and the like are prevented from adhering to the surface of the undercoat. When the foreign substances and the like adhere to the surface, an anchoring effect of the undercoat is degraded. As a countermeasure, in this modified example, the foreign substances and the like are prevented from adhering to prevent degradation of the anchoring effect. With this, degradation of adhesiveness between the undercoat and the topcoat can be prevented.

Fourth Embodiment

Figure 7:
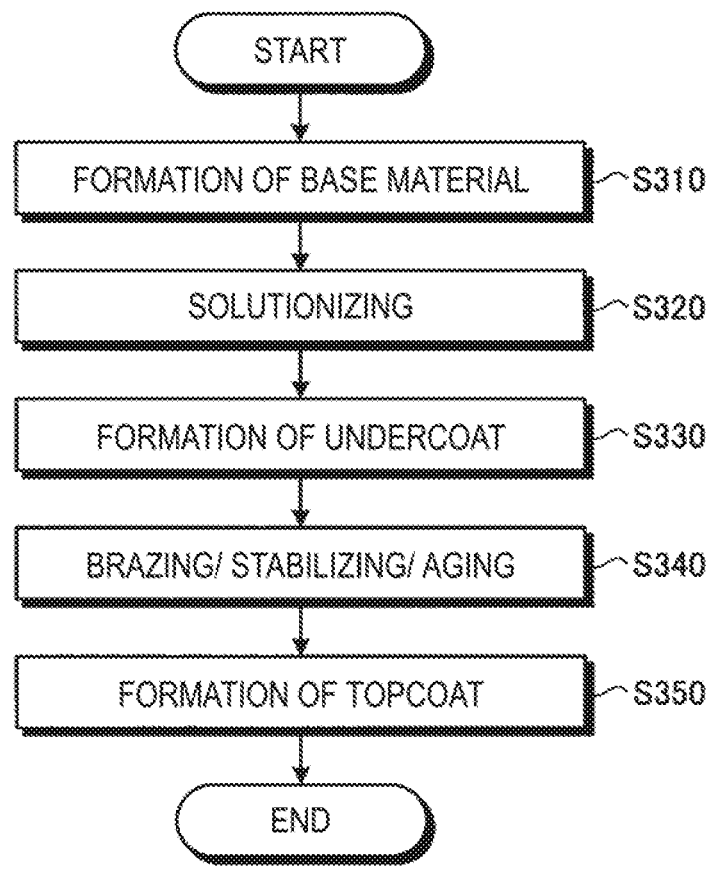
FIG. 7 is a flowchart for illustrating an example of a method of manufacturing a turbine blade according to a fourth embodiment of the present invention.

FIG. 7 is a flowchart for illustrating an example of a method of manufacturing a turbine blade according to a fourth embodiment of the present invention. As illustrated in FIG. 7, the method of manufacturing a turbine blade according to the fourth embodiment includes the step of forming the undercoat and the topcoat on the base material in addition to the steps in the method of manufacturing a turbine according to the second embodiment.

The method of manufacturing a turbine blade according to the fourth embodiment includes, for example, a step of forming the base material of a turbine blade (Step S310), a step of subjecting the base material to the solutionizing treatment (Step S320), a step of forming the undercoat on the base material (Step S330), a step of subjecting the base material to the brazing treatment, the stabilizing treatment, and the aging treatment (Step S340), and a step of forming the topcoat on the base material (Step S350).

Step S310 and Step S320 are similar to Step S10 and Step S20 in the first embodiment, respectively. Further, the configuration in which after Step S320 and before the undercoat is formed, the blast treatment and the cleaning treatment are performed, and after that, the undercoat is formed in Step S330 is similar to that in the third embodiment.

After the undercoat is formed, in Step S340, the brazing treatment, the stabilizing treatment, and the aging treatment are sequentially performed. The heating treatment is performed in a similar order to Step S130 in the second embodiment. Therefore, after the base material having the undercoat formed thereon is subjected to the preheating treatment at the preheating temperature T0 (for example, from 930° C. to 970° C.), the heating treatment as the brazing treatment and the stabilizing treatment is performed at the first temperature T1 (for example, from 1060° C. to 1100° C.). After that, the adjusting treatment is performed, and the heating treatment as the aging treatment is sequentially performed at the second temperature T2 (for example, from 830° C. to 870° C.). In Step S340, the heating treatment is performed at the temperature described above. Accordingly, the undercoat spreads on the roughened surface of the base material, and adhesiveness between the surface of the base material and the undercoat is improved.

After the brazing treatment, the stabilizing treatment, and the aging treatment are sequentially performed, the topcoat is formed on the surface of the undercoat in Step S350. In Step S350, the topcoat is formed in a similar order to Step S250 in the third embodiment.

In the fourth embodiment, after the undercoat is formed, the brazing treatment, the stabilizing treatment, and the aging treatment are sequentially performed before the topcoat is formed. Thus, the heating treatment can efficiently be performed in a short time period, and a spot and a crack in the topcoat can be prevented.

The technical scope of the present invention is not limited to the above-mentioned embodiments, and can be changed as appropriate without departing from the scope of the present invention. In the second embodiment described above, after the stabilizing treatment and when the adjusting treatment for lowering the furnace internal temperature to the second temperature T2 is performed, the base material is cooled at a temperature lowering rate of from 3° C./min to 20° C./min. However, the present invention is not limited to this example.

Figure 8:
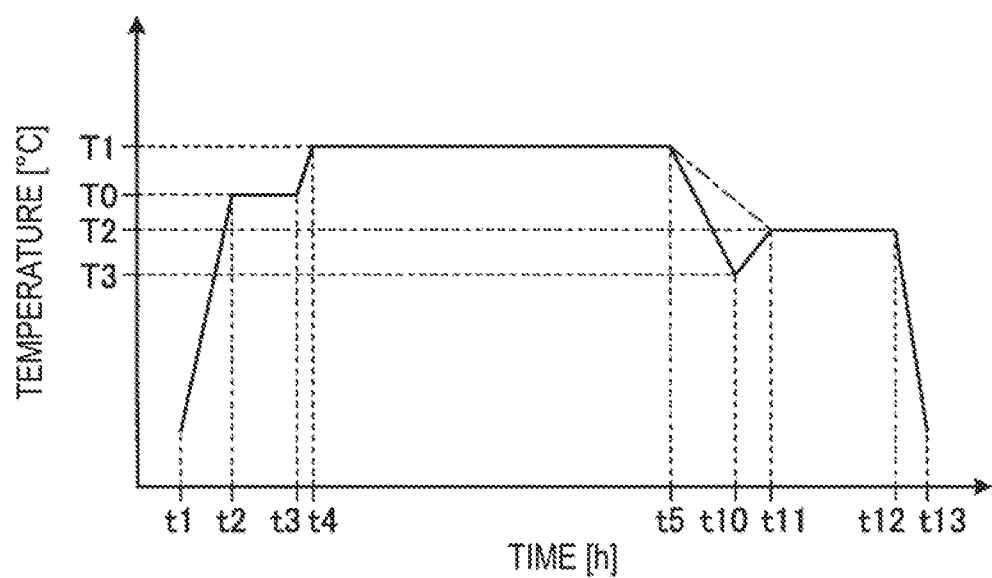
FIG. 8 is a graph for showing another example of a time change of a heating temperature in a case where brazing treatment, stabilizing treatment, and aging treatment are sequentially performed.

FIG. 8 is a graph for showing another example of a time change of a furnace internal temperature in a case where brazing treatment, stabilizing treatment, and aging treatment are sequentially performed. As shown in FIG. 8, after the stabilizing treatment, the base material may be cooled at a temperature lowering rate of, for example, approximately 30° C./min, and the heater may be operated when the temperature of the base material is at a third temperature T3 lower than the second temperature T2 (time t10). The third temperature T3 can be set to a temperature of, for example, from approximately 530° C. to approximately 570° C.

After the heater is operated, when the furnace internal temperature rises to reach the second temperature T2 (time t11), a rise in the furnace internal temperature is stopped, and the aging treatment is performed in the heating furnace at the second temperature T2. After that, similarly to the second embodiment, after the aging treatment is performed for a predetermined time period (time t12), the temperature of the base material is lowered rapidly to a predetermined cooling temperature at a temperature lowering rate of, for example, approximately 30° C./min (quenching) by, for example, stopping the heater of the heating furnace and supplying a cooling air into the heating furnace. After the furnace internal temperature turns to a predetermined temperature (time t13), the base material is picked up from the heating furnace. In this manner, the heating treatment is completed.

Even when the temperature changes as described above, a time period for the heating treatment can be shortened. Further, after the brazing treatment and the stabilizing treatment are performed at the first temperature T1, the adjusting treatment for adjusting the second temperature T2 being a heating temperature for the aging treatment is performed. With this, the heat in the heating furnace can efficiently be utilized. Note that, after the stabilizing treatment, when the base material is cooled at a temperature lowering rate of, for example, approximately 30° C./min to turn the furnace internal temperature to the second temperature T2, the aging treatment may be performed in the heating furnace at the second temperature T2.

Further, in the above-mentioned embodiments, when the temperature of the base material is lowered from the first temperature T1 in the adjusting treatment, the heater is stopped to lower the temperature of the base material. However, the present invention is not limited to this example. For example, the heater may be stopped, and a cooling air may be supplied to the heating furnace so that the temperature of the base material is lowered. With this, a temperature lowering rate for the temperature of the base material can be increased, and the temperature of the base material can be lowered in a short time period.

EXAMPLES

Next, description is made of Examples of the present invention. In Examples, a plurality of base materials are formed through casting from a Ni-based alloy with the composition described in the above-mentioned embodiments. The plurality of base materials are formed as directional solidification materials. In Example 1, the base material among the plurality of base materials is sequentially subjected to the brazing treatment, the stabilizing treatment, and the aging treatment under the temperature change in the second embodiment shown in FIG. 4. In Example 1, the first temperature T1 is set to 1090° C., and the second temperature T2 is set to 860° C. Further, in the adjusting treatment, from the first temperature T1 to the second temperature T2, the temperature of the base material is lowered at a temperature lowering rate of 5° C./min.

Further, in Example 2, the base material among the plurality of base materials is sequentially subjected to the brazing treatment, the stabilizing treatment, and the aging treatment under the temperature change shown in FIG. 8. In Example 2, the first temperature T1 is set to 1070° C., and the second temperature T2 is set to 840° C. Further, in the adjusting treatment, from the first temperature T1 to the second temperature T2, the temperature of the base material is lowered at a temperature lowering rate of 15° C./min.

Further, in Comparative Example, the base material among the plurality of base materials is independently subjected to the brazing treatment, the stabilizing treatment, and the aging treatment. In Comparative Example, the brazing treatment and the stabilizing treatment are performed at 1080° C. After the brazing treatment and after the stabilizing treatment, the temperature of the base material is lowered at a temperature lowering rate of 30° C./min. Further, in Comparative Example, the aging treatment is performed at 850° C.

Figure 9:
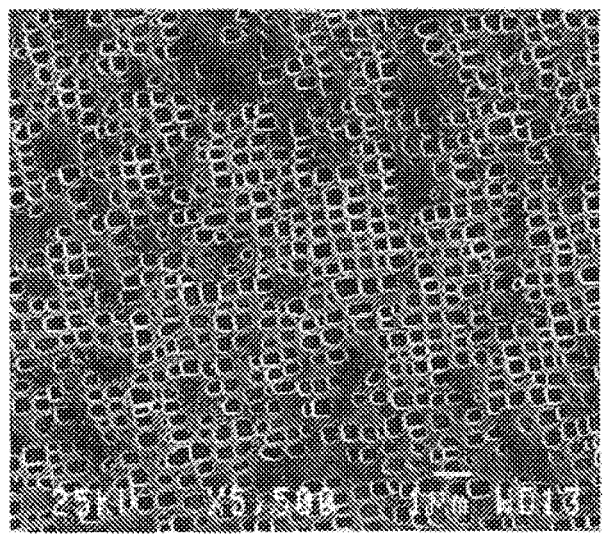
FIG. 9 is a microphotographic view for illustrating a precipitation state of a $\gamma'$ phase of a base material of a turbine blade in Comparative Example.
Figure 10:
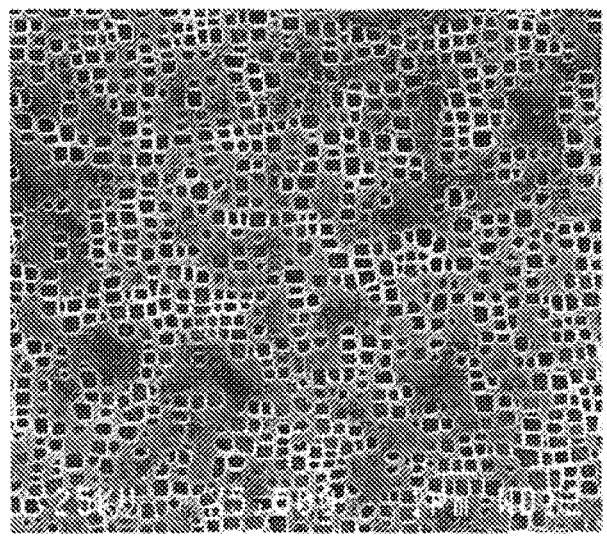
FIG. 10 is a microphotographic view for illustrating a precipitation state of a $\gamma'$ phase of a base material of a turbine blade in Example 1.
Figure 11:
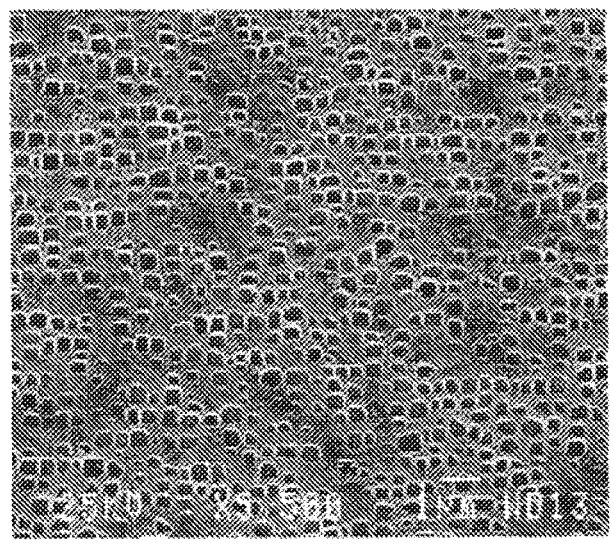
FIG. 11 is a microphotographic view for illustrating a precipitation state of a $\gamma'$ phase of a base material of a turbine blade in Example 2.

FIG. 9 is a microphotographic view for illustrating a precipitation state of a γ' phase of a base material of a turbine blade in Comparative Example. FIG. 10 is a microphotographic view for illustrating a precipitation state of a γ' phase of a base material of a turbine blade in Example 1. FIG. 11 is a microphotographic view for illustrating a precipitation state of a γ' phase of a base material of a turbine blade in Example 2.

As viewed from FIG. 9, in the base material in Comparative Example, the γ' phase precipitated and increased through the stabilizing treatment and the γ' phase having a smaller diameter, which is precipitated through the aging treatment are present in a balanced manner. As compared to this, as viewed from FIG. 10 and FIG. 11, in the base materials in Example 1 and Example 2, similarly to the base material in Comparative Example, the γ' phase precipitated and increased through the stabilizing treatment and the γ' phase having a smaller diameter, which is precipitated through the aging treatment are present in a balanced manner.

Therefore, in Examples, the brazing treatment, the stabilizing treatment, and the aging treatment are sequentially performed. Thus, a time period of the heating treatment can be shortened. Further, the precipitation state of the γ' phase, which is similar to that in Comparative Example in which the brazing treatment, the stabilizing treatment, and the aging treatment are independently performed, can be obtained.

REFERENCE SIGNS LIST

T0 Preheating temperature
T1 First temperature
T2 Second temperature

The invention claimed is:

1. A method of manufacturing a turbine blade, the method comprising:
   solutionizing a base material of a turbine blade at a temperature higher than a solidus temperature of a brazing material;
   after the solutionizing, performing a brazing treatment to join a brazing material to the base material by heating the base material having the brazing material arranged thereon and melting the brazing material;
   after the brazing treatment, performing a stabilizing treatment by heating the base material having the brazing material; and
   after the stabilizing treatment, performing an aging treatment by heating the base material, the aging treatment being performed at a temperature lower than the solidus temperature of the brazing material,
   wherein the brazing treatment and the stabilizing treatment are sequentially performed.

2. The method of manufacturing a turbine blade according to claim 1, wherein the brazing treatment and the stabilizing treatment are performed at a first temperature higher than a liquidus temperature of the brazing material, the first temperature being a temperature at which a γ' phase precipitated in the base material is increased.

3. The method of manufacturing a turbine blade according to claim 1, further comprising an adjusting treatment for adjusting a heating temperature for the aging treatment to a second temperature, the adjusting treatment being performed after the brazing treatment and the stabilizing treatment are performed at a first temperature.

4. The method of manufacturing a turbine blade according to claim 3, wherein the second temperature is lower than the first temperature.

5. The method of manufacturing a turbine blade according to claim 3, wherein the brazing treatment, the stabilizing treatment, and the aging treatment are performed in a predetermined heating furnace including a heater, and wherein, in the adjusting treatment, a furnace internal temperature is lowered by stopping the heater or by stopping the heater and supplying a cooling air to the heating furnace.

6. The method of manufacturing a turbine blade according to claim 3, wherein the brazing treatment, the stabilizing treatment, and the aging treatment are performed in a predetermined heating furnace including a heater, and wherein, in the adjusting treatment, the heater is operated, and the furnace internal temperature rises to the second temperature after the furnace internal temperature is lowered to a third temperature lower than the second temperature.

7. The method of manufacturing a turbine blade according to claim 1, the method further comprising:

forming an undercoat on a surface of the base material through use of a metallic material having a higher oxidation-resisting property than the base material; and forming a topcoat on a surface of the undercoat after the undercoat is formed, wherein the topcoat is formed after the base material is subjected to the brazing treatment and the stabilizing treatment, and wherein the aging treatment is performed after the topcoat is formed.

8. The method of manufacturing a turbine blade according to claim 7, wherein the undercoat is formed after the brazing treatment and the stabilizing treatment are performed.

9. The method of manufacturing a turbine blade according to claim 1, the method further comprising:

forming an undercoat on a surface of the base material through use of a metallic material having a higher oxidation-resisting property than the base material; and forming a topcoat on a surface of the undercoat after the undercoat is formed, wherein the topcoat is formed after the undercoat is formed and the base material is subjected to the brazing treatment, the stabilizing treatment, and the aging treatment.

* * * * *